(12) United States Patent
Russalian

(10) Patent No.: US 10,683,793 B2
(45) Date of Patent: Jun. 16, 2020

(54) COOLANT CONTROL VALVE WITH LOAD-LIMITING END STOP ARRANGEMENT

(71) Applicant: Schaeffler Technologies AG & Co. KG, Herzogenaurach (DE)

(72) Inventor: Vigel Russalian, Macomb, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 135 days.

(21) Appl. No.: 16/106,318

(22) Filed: Aug. 21, 2018

(65) Prior Publication Data

US 2019/0055878 A1 Feb. 21, 2019

Related U.S. Application Data

(62) Division of application No. 15/677,076, filed on Aug. 15, 2017, now Pat. No. 10,094,268.

(51) Int. Cl.
| | |
|---|---|
| *F01P 7/16* | (2006.01) |
| *F16K 5/08* | (2006.01) |
| *F16K 5/06* | (2006.01) |
| *F16K 11/087* | (2006.01) |
| *F01P 7/14* | (2006.01) |

(52) U.S. Cl.
CPC ............. *F01P 7/16* (2013.01); *F16K 5/0647* (2013.01); *F16K 5/08* (2013.01); *F16K 11/0876* (2013.01); *F01P 2007/146* (2013.01)

(58) Field of Classification Search
CPC ..... F01P 7/16; F01P 2007/146; F16K 11/0876; F16K 5/0647; F16K 5/08
USPC ................................. 251/286–287, 297, 304
See application file for complete search history.

(56) References Cited

U.S. PATENT DOCUMENTS

| | | | | |
|---|---|---|---|---|
| 2,030,150 | A * | 2/1936 | Mueller | F16K 5/106 251/285 |
| 2,655,177 | A * | 10/1953 | Ryon | F16K 35/02 137/556.3 |
| 3,473,551 | A * | 10/1969 | Murauskas | F16K 3/08 137/269 |
| 4,064,904 | A * | 12/1977 | Tolnai | F16K 31/508 137/454.5 |
| 5,732,734 | A * | 3/1998 | Buccicone | F16K 3/08 137/454.6 |
| 7,325,782 | B2 * | 2/2008 | Gebler | F16K 31/003 251/129.11 |
| 8,899,548 | B2 * | 12/2014 | Hauk | F16K 31/045 251/129.12 |
| 2009/0114169 | A1 * | 5/2009 | Heldberg | F16K 11/0873 123/41.1 |

* cited by examiner

*Primary Examiner* — John Bastianelli

(57) ABSTRACT

A coolant control valve for an internal combustion engine, including: a housing; a rotary valve disposed within the housing, the rotary valve including an axis of rotation and an end stop extending in a radial direction toward the axis of rotation; and a resilient element connected to the housing. In a circumferential position of the rotary valve about the axis of rotation: a circle, centered on the axis of rotation, passes through the resilient element and the end stop; and the end stop is in contact with the resilient element.

20 Claims, 7 Drawing Sheets

COOLANT CONTROL VALVE WITH LOAD-LIMITING END STOP ARRANGEMENT

CROSS-REFERENCE TO RELATED APPLICATIONS

This application is a divisional of U.S. patent application Ser. No. 15/677,076 filed Aug. 15, 2017, which application is incorporated herein by reference in its entirety.

TECHNICAL FIELD

The present disclosure relates to a coolant control valve having a load-limiting end stop arrangement, in particular, a resilient end stop for blocking rotation of a rotary valve and collapsible for excessive loads on the end stop.

BACKGROUND

FIG. 7 shows a portion of prior art coolant control valve 200. Valve 200 includes: housing 202; end stop 204 fixedly connected to housing 202; and rotary valve 206 with end stop 208. End stop 204 is made of a rigid, non-flexible material, for example plastic used to construct housing 202. Valve 206 includes axis of rotation AR. Coolant control valves such as valve 200 are used in internal combustion engines and typically include at least one actuator (not shown) and one or more rotary valves, such as valve 206. End stops 204 and 208 are provided on housing 202 and rotary valve 206, respectively, to limit the rotation travel angle of rotary valve 206. Also, end stops 204 and 208 are used for calibrating rotary valve 206.

To reduce cost and weight of valve 200, plastics are typically used for end stop 204 and/or end stop 208. However, a plastic end stop 204 or 208 tends to break due to fatigue after extended use, or from excessive loads, for example associated with rotation of valve 206. Valve 200 does not function properly without intact end stops 204 and 208. For example, when one or both of end stops 204 and 208 break, valve 206 can rotate past the circumferential position of end stop 204, nullifying calibration and control schemes for valve 206. The problem of end stop failure is exacerbated by the need to reduce the circumferential thickness of end stops 204 and/or 208 to maximize rotary valve travel, thereby further reducing the strength and durability of the end stops.

SUMMARY

According to aspects illustrated herein, there is provided a coolant control valve for an internal combustion engine, including: a housing; a first rotary valve disposed within the housing, the first rotary valve including an axis of rotation and an end stop extending in a first radial direction toward the axis of rotation; and a resilient element connected to the housing. In a first circumferential position of the rotary valve about the axis of rotation: a first circle, centered on the axis of rotation, passes through the resilient element and the end stop; and the end stop is in contact with the resilient element.

According to aspects illustrated herein, there is provided a coolant control valve for an internal combustion engine, including: a housing; a rotary valve disposed within the housing, the rotary valve including an axis of rotation and an end stop; and a resilient element. The resilient element: is fixedly connected to a surface of the housing; extends from the surface in a first axial direction parallel to the axis of rotation; and includes a portion furthest from the surface of the housing in the first axial direction. In a first circumferential position of the rotary valve about the axis of rotation, the portion is: in contact with the resilient element; and is free of contact with the portion. In a second circumferential position of the rotary valve about the axis of rotation, the portion is in contact with the end stop.

According to aspects illustrated herein, there is provided a coolant control valve for an internal combustion engine, including: an axis of rotation; a housing including a surface facing in a first axial direction, parallel to the axis of rotation; a rotary valve disposed within the housing; and a resilient element. The rotary valve includes: a surface; and an end stop fixedly connected to the surface of the rotatory valve and extending radially inwardly from the surface of the rotatory valve. The resilient element: is fixedly connected to the surface of the housing; and includes a portion extending furthest from the surface of the housing in the first axial direction. In a first circumferential position of the rotary valve, the end stop: is in contact with the resilient element; and is free of contact with the portion of the resilient element.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
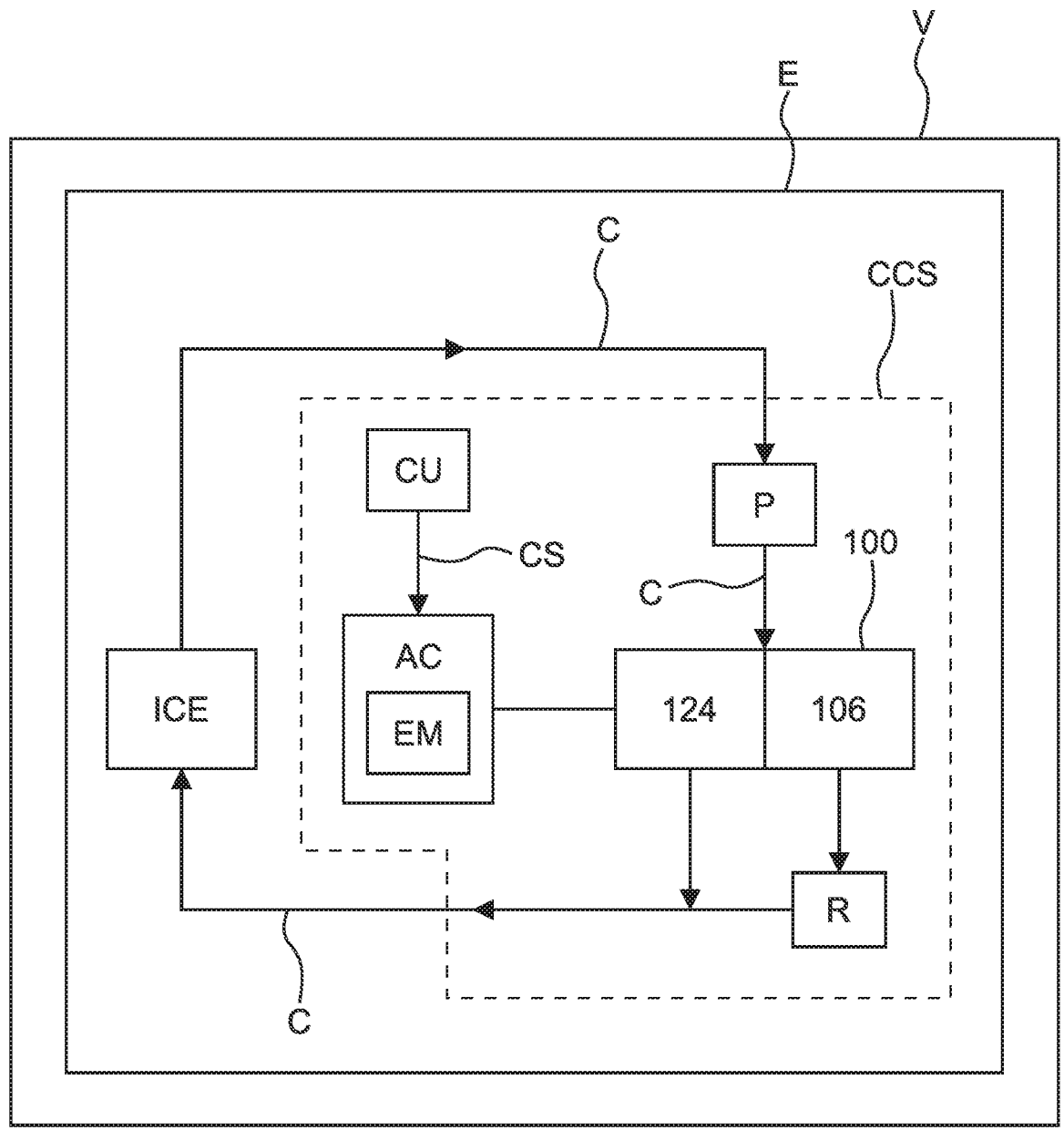
FIG. 1 is block diagram of a coolant control system for an internal combustion engine, including a coolant control valve with a load-limiting end stop arrangement.

FIG. 1 is a block diagram of example coolant control system CCS for internal combustion engine ICE, including coolant control valve 100 with a load-limiting end stop arrangement.

Figure 2:
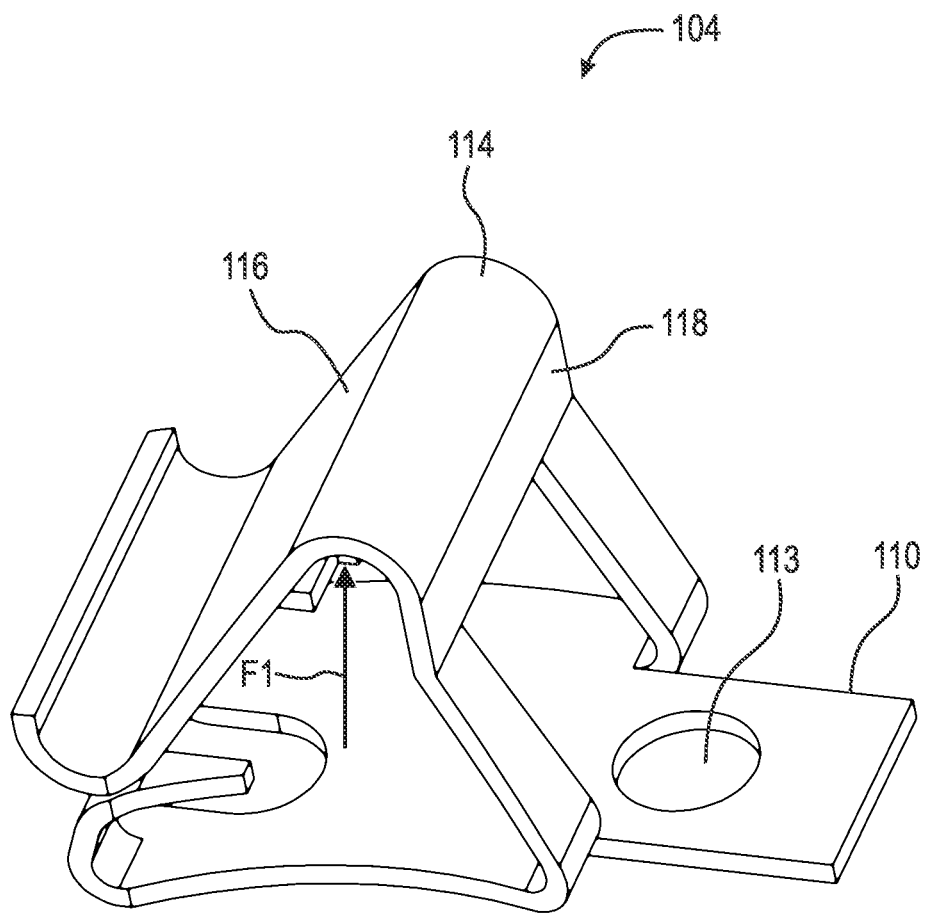
FIG. 2 is a perspective view of an example resilient element end stop.

FIG. 2 is a perspective view of example resilient element 104.

Figure 3:
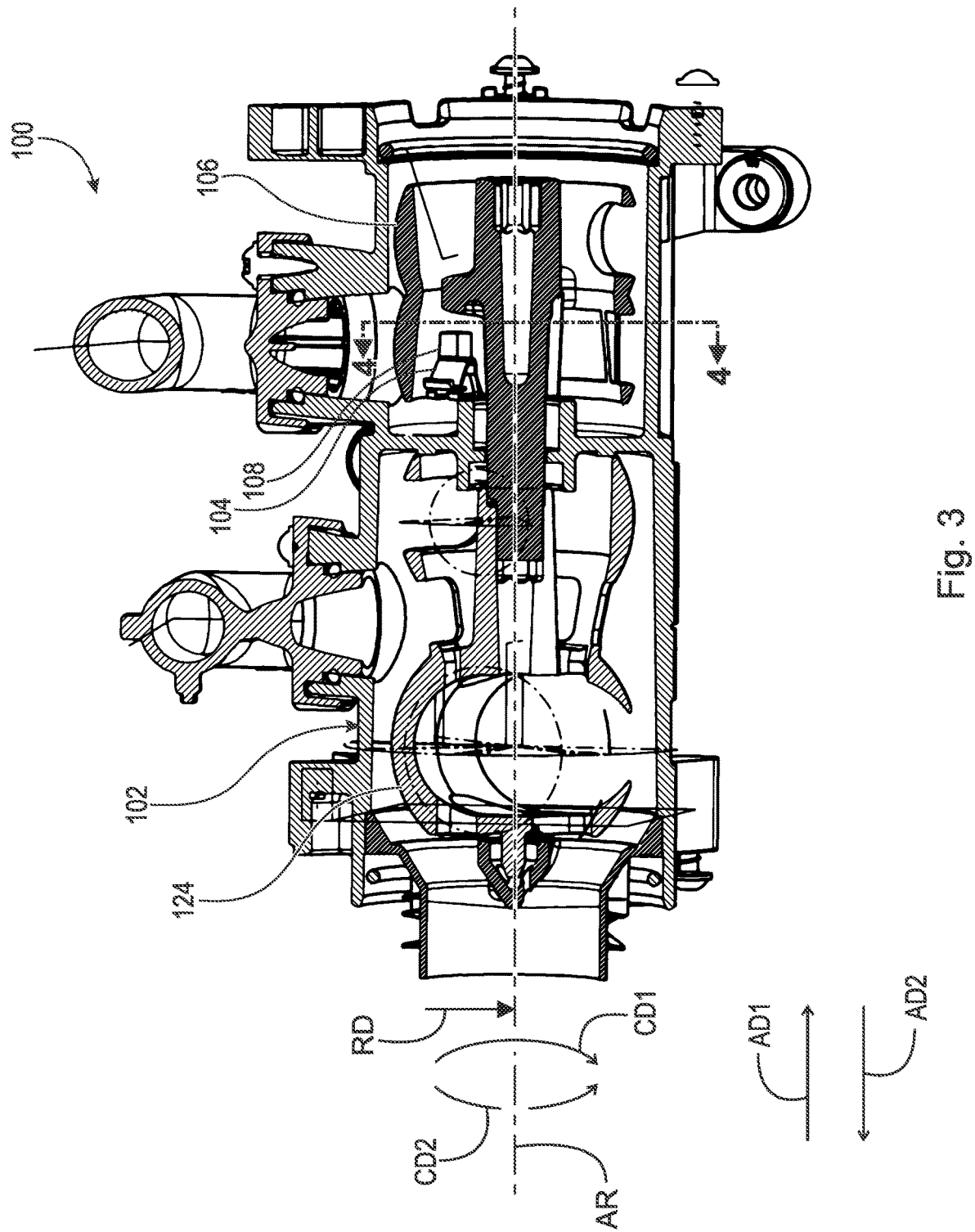
FIG. 3 is cross-sectional view of the coolant control valve in FIG. 1, including the resilient element of FIG. 2, in a first circumferential position.

FIG. 3 is cross-sectional view of coolant control valve 100 in FIG. 1, including resilient element 104 of FIG. 2, in a first circumferential position. The following should be viewed in light of FIGS. 1 through 3. Valve 100 includes: housing 102; resilient element, or end stop, 104 fixedly connected to housing 102; and rotary valve 106 with end stop 108. Engine ICE is part of vehicle V. System CCS includes: actuator AC, with electric motor EM, connected to valve 100; control unit CU; pump P; and radiator R. Pump P is arranged to pump coolant C through system CCS. Unit CU is arranged to transmit control signal CS to actuator AC. Actuator AC is arranged to rotate rotary valve 106 in circumferential directions CD1 and CD2 about axis of rotation AR for valve 106, in accordance with signal CS.

Figure 4:
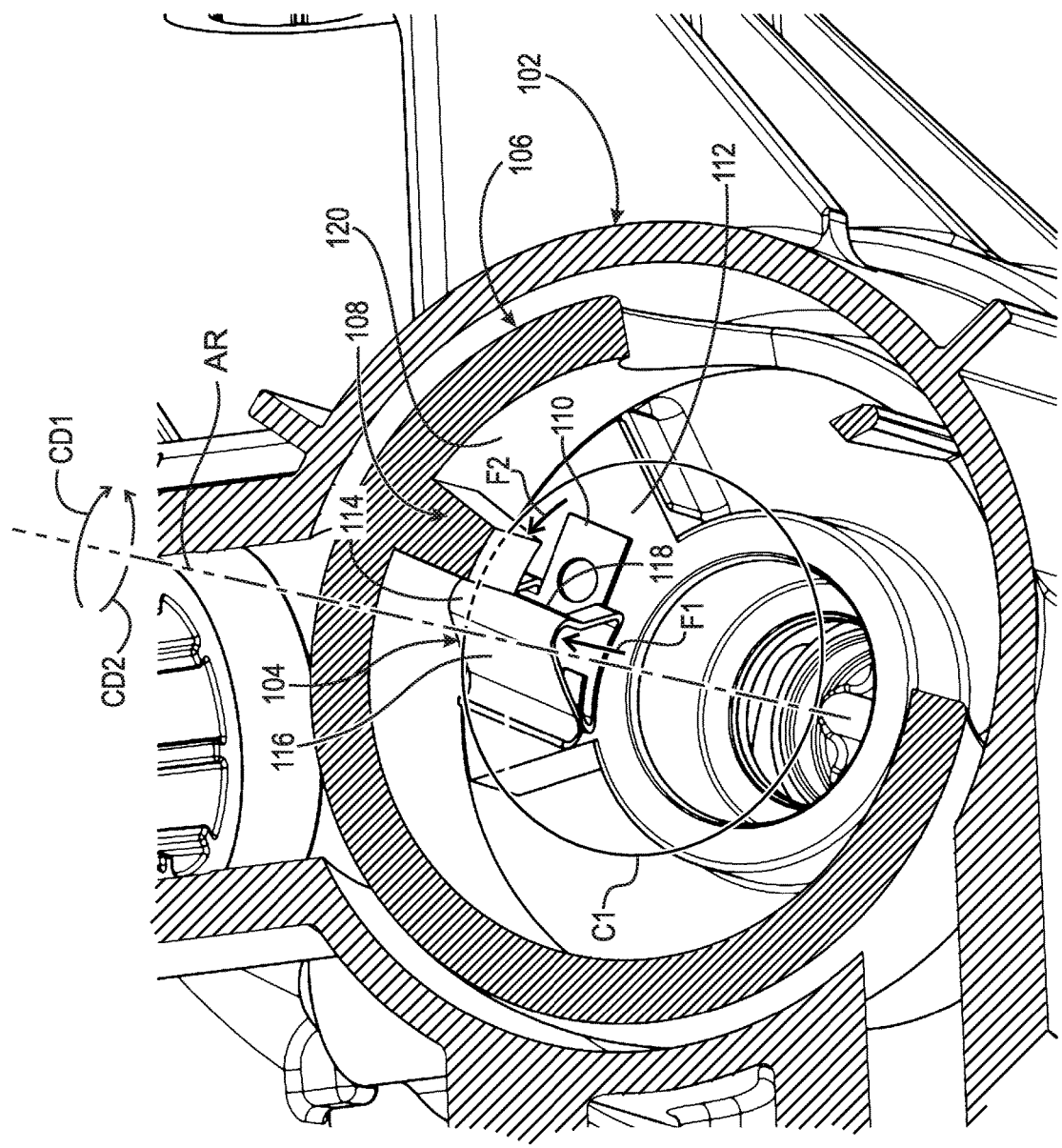
FIG. 4 is a perspective cross-sectional view generally along line 4-4 in FIG. 3.

FIG. 4 is a perspective cross-sectional view generally along line 4-4 in FIG. 3. The following should be viewed in light of FIGS. 1 through 4. Element 104 is fixedly connected to housing 102. For example, portion 110 of element 104 is fixedly connected to surface 112 of housing 102 by any means known in the art. For example, hole 113 in element 104 can accommodate a screw (not shown) for fastening element 104 to housing 102. Surface 112 faces in axial direction AD1, parallel to axis AR. Element 104 includes portion 114 and sides 116 and 118. In the example of FIGS. 3 and 4, portion 114 is disposed furthest from surface 112 in direction AD1 and sides 116 and 118 face in opposite circumferential direction CD2 and CD1, respectively. Portion 114 is formed by the conjunction of sides 116 and 118. Resilient element 104 resists compression, for example of portion 114, in direction AD2, opposite direction AD1, with force F1.

In the first circumferential position of FIGS. 3 and 4, valve 106 has been rotated by motor EM in direction CD1 until end stop 108 contacts element 104, for example, contacts side 118. End stop 108 urges element 104, for example portion 114, in direction AD2 with force F2. When force F2 is less than or equal to force F1, element 104 blocks rotation of end stop 108 and valve 106 past element 104 in direction CD1. That is, force F2 does not overcome force F1 and end stop 108 does not compress element 104 in direction AD2 enough to achieve the configuration shown in FIG. 5. To simplify the discussion, any frictional forces between end stop 108 and element 104, which would resist the displacement of end stop 108 with respect to element 104 are accounted for in force F1. Thus, end stop 108 cannot rotate past element 104 in direction CD1. Note that some flexing of element 104 may occur due to the contact with end stop 108, but end stop 108 does not achieve the configuration shown in FIG. 5. In the example of FIGS. 3 and 4, portion 114 is free of contact with end stop 108. The instance in which force F2 is greater than force F1 is discussed below.

In the configuration of FIGS. 3 and 4, circle C1, centered on axis of rotation AR, passes through resilient element 104 and end stop 108. That is, element 104 and end stop 108 are aligned in directions CD1 and CD2. In the example of FIGS. 3 and 4, end stop 108 extends radially inward in direction RD (toward axis AR) from surface 120 of housing 102.

Figure 5:
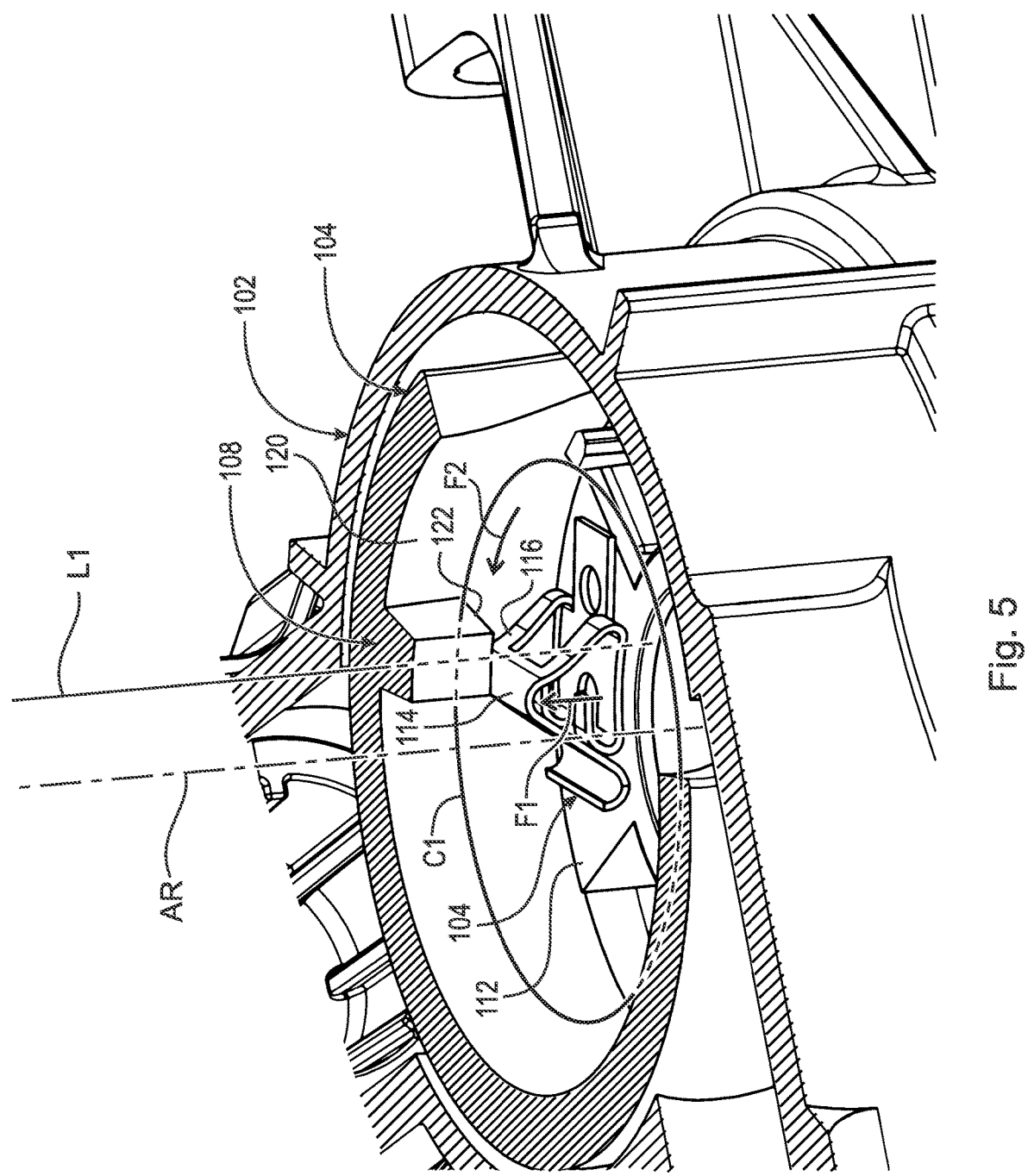
FIG. 5 shows the rotary valve in FIG. 4 in a second circumferential position.

FIG. 5 shows rotary valve 106 in FIG. 4 in a second circumferential position. Note that the perspective of FIG. 5 is altered from that of FIG. 4 to better show the attributes discussed below. FIG. 5 illustrates the case in which force F2 is greater than force F1. Thus, force F2 overcomes force F1 and end stop 108 compresses element 104 in direction RD until portion 114 is in contact with end stop 108, for example, until portion 114 is in contact with surface 122 of end stop 108 facing in direction AD2. Therefore, end stop 108 continues rotating in direction CD1, after contacting side 116, to compress element 104 in direction AD2. In the example of FIG. 5, an entirety of element 104 is located beyond end stop 108 in direction AD2. In the example of FIG. 5, circle C1 passes through end stop 108 without passing through element 104. That is, element 104 and end stop 108 are no longer aligned in directions CD1 and CD2. Line L1, parallel to axis AR, passes through portion 114 and end stop 108.

Figure 6:
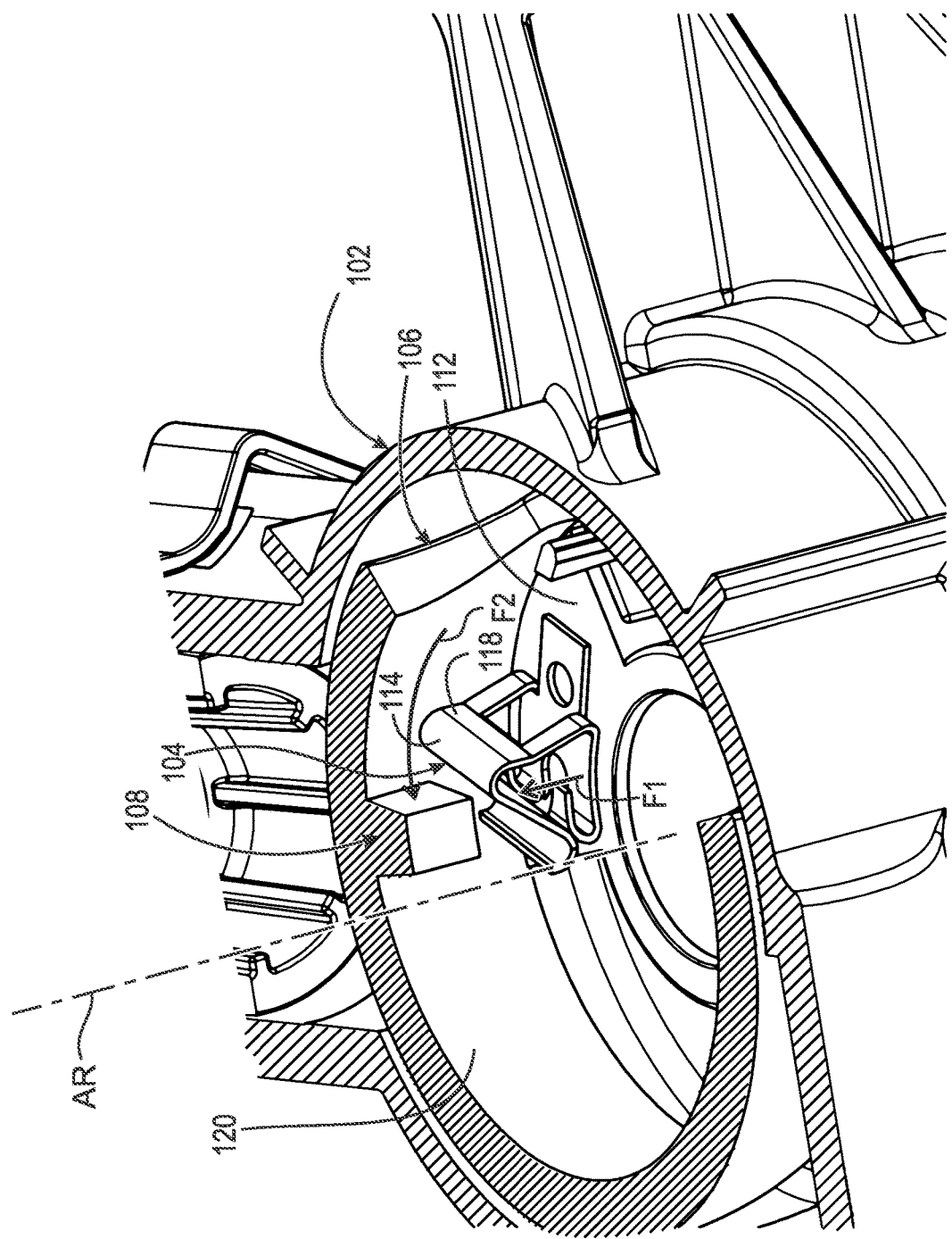
FIG. 6 shows the rotary valve in FIG. 4 rotated in a circumferential direction past the second circumferential position; and, FIG. 7 shows a portion of a prior art coolant control valve.
Figure 7:
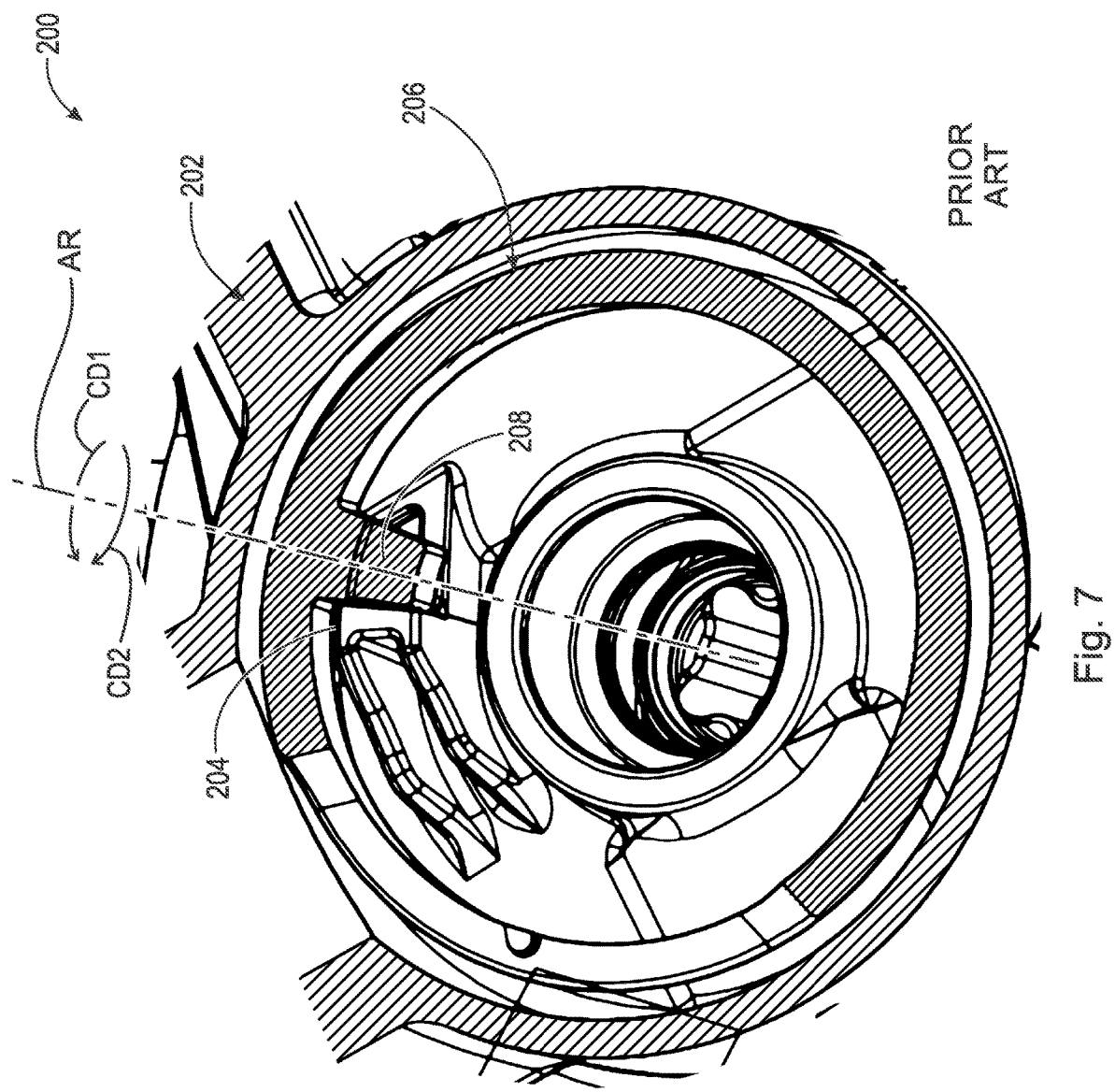

FIG. 6 shows rotary valve 106 in FIG. 3 rotated in circumferential direction CD1 past the second circumferential position shown in FIG. 5. Note that the perspective of FIG. 6 is altered from that of FIGS. 4 and 5 to better show the attributes discussed below. To attain the position shown in FIG. 6 from the position shown in FIG. 5, valve 106 has been rotated by motor EM further in direction CD1 to slide end stop 108 along resilient element 104 and displace end stop 108 past element 104.

In an example embodiment, valve 100 includes rotary valve 124 non-rotatably connected to rotary valve 106. For example, valve 106 is a primary valve and valve 124 is a secondary valve. Actuator AC rotates both valve 106 and valve 124.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AC actuator
AR axis of rotation
C coolant
C1 circle
CCS coolant control system
CD1 circumferential direction
CD2 circumferential direction
CS control system
CU control unit
EM electric motor
F1-2 force
ICE internal combustion engine
L1 line
P pump
R radiator
RD radial direction
V vehicle
100 coolant control valve
102 housing
104 resilient element
106 rotary valve
108 end stop
110 portion of element 104
112 surface of housing 102
113 hole
114 portion of element 104
116 side of element 104
118 side of element 104

120 surface of housing 102
122 surface of end stop 108
124 rotary valve
200 prior art coolant control valve
202 housing
204 end stop
206 rotary valve
208 end stop

The invention claimed is:

1. A coolant control valve for an internal combustion engine, comprising:
a housing;
a first rotary valve disposed within the housing, the first rotary valve including:
an axis of rotation; and,
an end stop extending in a first radial direction toward the axis of rotation; and,
a resilient element connected to the housing, wherein in a first circumferential position of the first rotary valve about the axis of rotation:
a circle, centered about the axis of rotation, passes through the resilient element and the end stop; and,
the end stop is in contact with the resilient element and is arranged to axially displace the resilient element.

2. The coolant control valve of claim 1, wherein:
the housing includes a surface facing in a first axial direction parallel to the axis of rotation;
the resilient element is fixedly connected to the surface of the housing;
the resilient element includes a portion located furthest from the surface of the housing in the first axial direction; and,
in a second circumferential position of the first rotary valve about the axis of rotation, the portion of the resilient element is in contact with the end stop.

3. The coolant control valve of claim 1, wherein:
the housing includes a surface facing in a first axial direction parallel to the axis of rotation;
the resilient element is fixedly connected to the surface of the housing;
the resilient element includes a portion located furthest from the surface of the housing in the first axial direction; and,
in the first circumferential position of the first rotary valve, the portion of the resilient element is free of contact with the end stop.

4. The coolant control valve of claim 1, wherein:
the housing includes a surface facing in a first axial direction parallel to the axis of rotation;
the resilient element is fixedly connected to the surface of the housing;
the resilient element includes a portion located furthest from the surface of the housing in the first axial direction;
the end stop includes a surface facing in a second axial direction, opposite the first axial direction; and,
in a second circumferential position of the first rotary valve about the axis of rotation, the portion of the resilient element is in contact with the surface of the end stop.

5. The coolant control valve of claim 1, wherein in a second circumferential position of the first rotary valve about the axis of rotation, the circle passes through the end stop without passing through the resilient element.

6. The coolant control valve of claim 1, wherein:
the housing includes a surface facing in a first axial direction parallel to the axis of rotation;
the resilient element is fixedly connected to the surface;
the resilient element includes a portion located furthest from the surface of the housing in the first axial direction; and,
in a second circumferential position of the first rotary valve about the axis of rotation, a line parallel to the axis of rotation passes through the portion of the resilient element and the end stop.

7. The coolant control valve of claim 1, wherein:
the housing includes a surface facing in a first axial direction parallel to the axis of rotation;
the resilient element is fixedly connected to the surface of the housing; and,
in a second circumferential position of the first rotary valve about the axis of rotation, an entirety of the resilient element is located beyond the end stop in a second axial direction, opposite the first axial direction.

8. The coolant control valve of claim 1, wherein:
the housing includes a surface;
the resilient element is:
fixedly connected to the surface of the housing; and,
extends from the surface of the housing in a first axial direction parallel to the axis of rotation;
the resilient element resists compression, in a second axial direction, opposite the first axial direction, with a first force; and,
in a second circumferential position of the first rotary valve about the axis of rotation, the end stop urges the resilient element, in the second axial direction, with a second force greater than the first force.

9. The coolant control valve of claim 1, further comprising:
a second rotary valve disposed in the housing and non-rotatably connected to the first rotary valve.

10. A coolant control valve for an internal combustion engine, comprising:
a housing including a surface;
a rotary valve disposed within the housing, the rotary valve including:
an axis of rotation; and,
an end stop; and,
a resilient element:
fixedly connected to the surface of the housing;
extending from the surface of the housing in a first axial direction parallel to the axis of rotation; and,
including a portion furthest from the surface of the housing in the first axial direction, wherein:
in a first circumferential position of the rotary valve about the axis of rotation, the end stop is:
in contact with the resilient element; and,
free of contact with the portion of the resilient element; and,
in a second circumferential position of the rotary valve about the axis of rotation, the end stop is in contact with the portion of the resilient element and urges the portion in a second axial direction, opposite the first axial direction.

11. The coolant control valve of claim 10, wherein:
the end stop includes a surface facing in the second axial direction; and,
in the second circumferential position of the rotary valve, a line, parallel to the axis of rotation, passes through the portion of the resilient element and the surface of the end stop.

12. The coolant control valve of claim 11, wherein:
the resilient element resists compression, in the second axial direction with a first force; and, in the second circumferential position of the rotary valve about the axis of rotation, the end stop urges the resilient element in the second axial direction with a second force greater than the first force.

13. The coolant control valve of claim 10, wherein in the second circumferential position of the rotary valve about the axis of rotation, an entirety of the resilient element is located beyond the end stop in a second axial direction, opposite the first axial direction.

14. A coolant control valve for an internal combustion engine, comprising:
an axis of rotation;
a housing including a surface facing in a first axial direction, parallel to the axis of rotation;
a rotary valve disposed within the housing, the rotary valve including;
a surface; and,
an end stop:
fixedly connected to the surface of the rotary valve; and,
extending radially inwardly from the surface of the rotary valve;
a resilient element:
fixedly connected to the surface of the housing; and,
including a portion extending furthest from the surface of the housing in the first axial direction, wherein:
in a first circumferential position of the rotary valve about the axis of rotation, the end stop:
is in contact with the resilient element; and,
is free of contact with the portion of the resilient element; and,
in a second circumferential position of the rotary valve about the axis of rotation, the end stop is in contact with the portion of the resilient element and is arranged to axially displace the portion of the resilient element.

15. The coolant control valve of claim 14, wherein:
the end stop includes a surface facing in a second axial direction, opposite the first axial direction; and,
in the second circumferential position of the rotary valve, the surface of the end stop is in contact with the portion of the resilient element.

16. The coolant control valve of claim 14, wherein:
in the first circumferential position of the rotary valve, a circle, centered about the axis of rotation, passes through the end stop and the resilient element; and,
in the second circumferential position of the rotary valve, the circle passes through the end stop without passing through the resilient element.

17. The coolant control valve of claim 14, wherein:
the end stop includes a surface facing in a second axial direction, opposite the first axial direction; and,
in the second circumferential position of the rotary valve, a line, parallel to the axis of rotation, passes through the portion of the resilient element and the surface of the end stop.

18. The coolant control valve of claim 14, wherein:
the end stop includes a surface facing in a second axial direction, opposite the first axial direction; and,
in the second circumferential position of the rotary valve:
the portion of the resilient element is in contact with the surface of the end stop; and,
an entirety of the resilient element is located beyond the end stop in the second axial direction.

19. The coolant control valve of claim 14, wherein:
the resilient element resists compression, in a second axial direction, opposite the first axial direction, with a first force; and,
in the first circumferential position, the end stop urges the resilient element in the second axial direction with a second force less than the first force.

20. The coolant control valve of claim 14, wherein:
the end stop includes a surface facing in a second axial direction, opposite the first axial direction;
the resilient element resists compression, in the second axial direction, with a first force; and,
in the second circumferential position of the rotary valve:
the portion of the resilient element is in contact with the surface of the end stop; and,
the end stop urges the resilient element, in the second axial direction, with a second force greater than the first force.

\* \* \* \* \*